United States Patent [19]

Bouverie

[11] Patent Number: 5,207,546
[45] Date of Patent: May 4, 1993

[54] SECUREMENT DEVICE ADAPTED TO RETAIN IN A PREDETERMINED POSITION A FIRST MEMBER ON A SECOND MEMBER

[75] Inventor: Alain P. C. Bouverie, Cerisy-La-Foret, France

[73] Assignee: Moulinex (Societe Anonyme), Bagnolet, France

[21] Appl. No.: 862,367

[22] Filed: Apr. 2, 1992

[30] Foreign Application Priority Data

Apr. 11, 1991 [FR] France ............................ 91 04450

[51] Int. Cl.⁵ ...................... A44B 17/00; F16B 21/00
[52] U.S. Cl. .................................. 411/553; 411/510; 411/913; 24/453; 24/590
[58] Field of Search .................. 24/590, 453; 411/510, 411/553, 554, 549, 913

[56] References Cited

U.S. PATENT DOCUMENTS

| | | | |
|---|---|---|---|
| 3,244,057 | 4/1966 | Mathison | 411/510 |
| 3,494,244 | 2/1970 | Wayland | 24/453 |
| 4,400,856 | 8/1983 | Tseng | 24/590 |
| 4,454,699 | 6/1984 | Strobl | 411/510 |
| 4,527,760 | 7/1985 | Salacuse | 24/590 |
| 4,531,870 | 7/1985 | Moryl et al. | 24/453 |
| 4,568,215 | 2/1986 | Nelson | 411/510 |
| 4,599,768 | 7/1986 | Doyle et al. | 24/590 |
| 4,728,238 | 3/1988 | Chisholm et al. | 411/510 |

FOREIGN PATENT DOCUMENTS

1256295 12/1971 United Kingdom ................ 411/553

*Primary Examiner*—Victor N. Sakran
*Attorney, Agent, or Firm*—Young & Thompson

[57] ABSTRACT

A securement member (13-18) has a relatively rigid foot (4-25) adapted to be secured on a first member (1) and prolonged by a body (5-19) provided in at least one region of its side surface with protuberant elastic hooking formations (7-20), and a seat (8-23) provided in the second member (2) whose internal side wall (9-24') has a shape of revolution, and adapted to receive with friction the body (5-19) and the hooking formations (7-20). The securement member (3-18) and the seat (8) comprise a mutual unlocking assembly (13-22, 24) permitting, by movement of rotation between the securement member (3-18) and the seat (8-23), effecting the escape of the hooking formations from the side wall of the seat. The invention is particularly applicable to devices for securing an appliance housing on a wall.

6 Claims, 2 Drawing Sheets

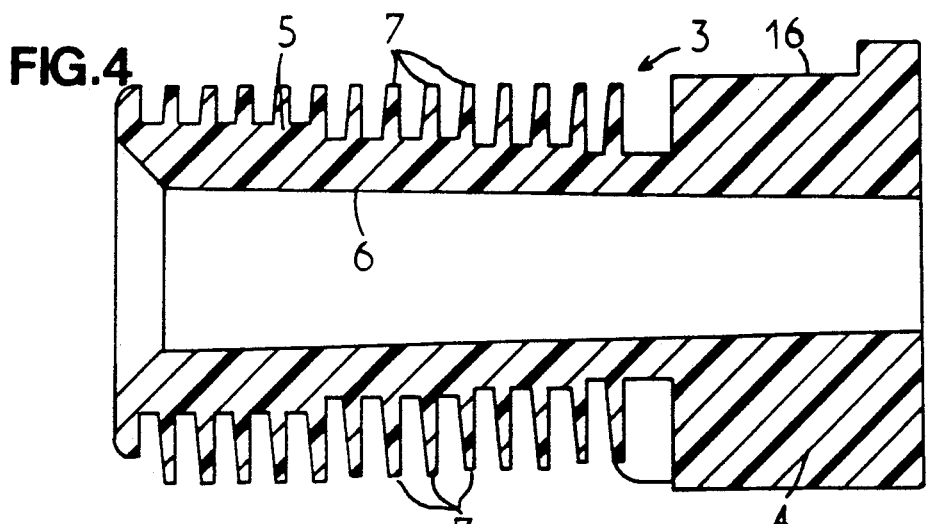
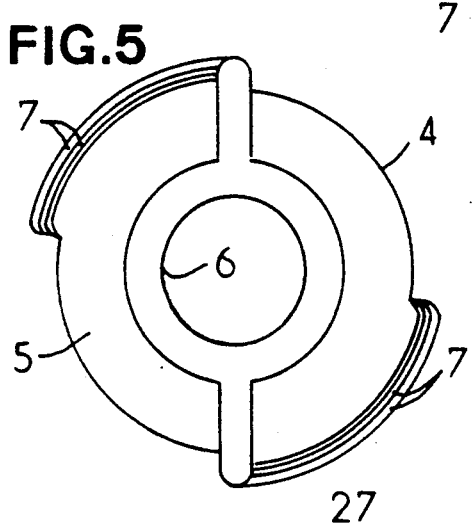
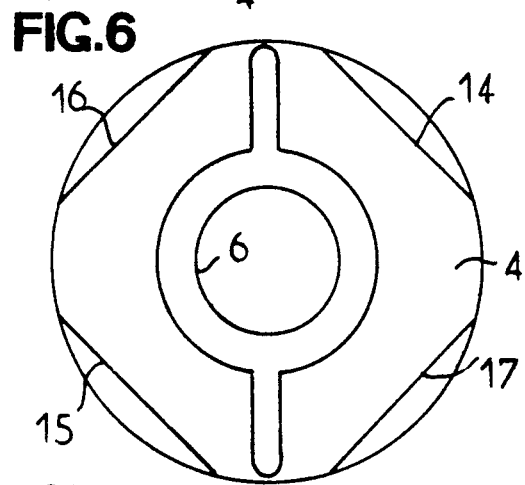
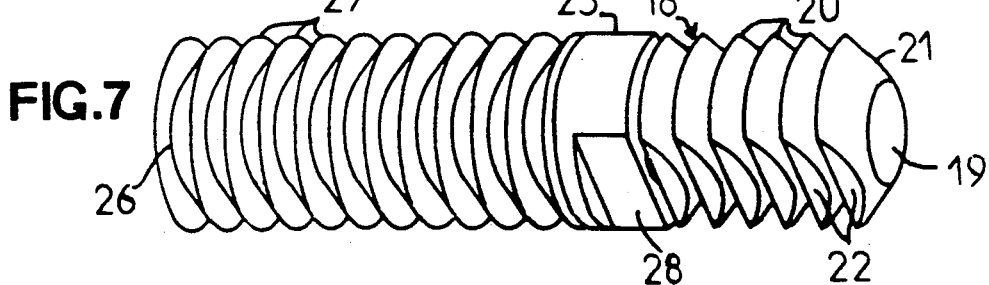
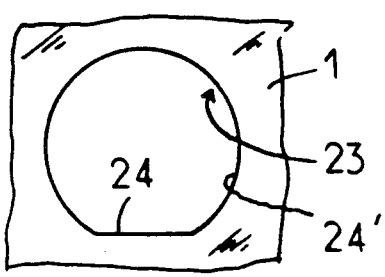

SECUREMENT DEVICE ADAPTED TO RETAIN IN A PREDETERMINED POSITION A FIRST MEMBER ON A SECOND MEMBER

The invention relates to a securement device adapted to retain in a predetermined position a first member on a second member, and comprising respectively a securement member having a relatively rigid foot adapted to be fixed to the first member and having on at least one region of its lateral surface protruding elastic hooking means, and a seat provided in the second member whose internal side wall has a shape of revolution, and adapted to receive with friction the body and the hooking means.

With a device of this type, it will be seen that once the body is received in the seat, the friction between the elastic hooking means and the internal side wall of the seat is sufficiently great to practically prevent any demounting. This is particularly true, when the first member is an appliance housing and the second member a wall and when it is not possible to reach the securement of the foot which is located behind the housing. This securement device, useful to avoid any unauthorized removal of a first member from a second member, becomes particularly troublesome when it is desired to effect demounting.

The invention has for its object to improve this type of securement device, which permits overcoming this drawback.

According to the invention, the securement member and the housing comprise mutual unlocking means permitting, by a movement of rotation between the securement member and the housing, to obtain the release of the hooking means from the side wall of the seat.

Thanks to this unlocking means, it will be understood that it is possible, once the securement device is engaged to achieve by simple rotation, known only to the installer, an unlocking of said securement device so as to permit removal of the members from each other.

The characteristics and advantages of the invention will become further apparent from the description which follows, by way of example, with reference to the accompanying drawing, in which:

FIG. 4 is a view on a larger scale of a securement member shown in FIG. 2, taken on the line 4—4 in FIGS. 5 and 6;

FIG. 5 is a cross-sectional view taken on the line 5—5 of FIG. 4;

FIG. 6 is a cross-sectional view taken on the line 6—6 of FIG. 4;

FIG. 7 is a perspective view of another embodiment of the securement member according to the invention; and FIG. 8 shows in elevation the shape of the opening of the seat corresponding to the securement member of FIG. 7.

Figure 1:
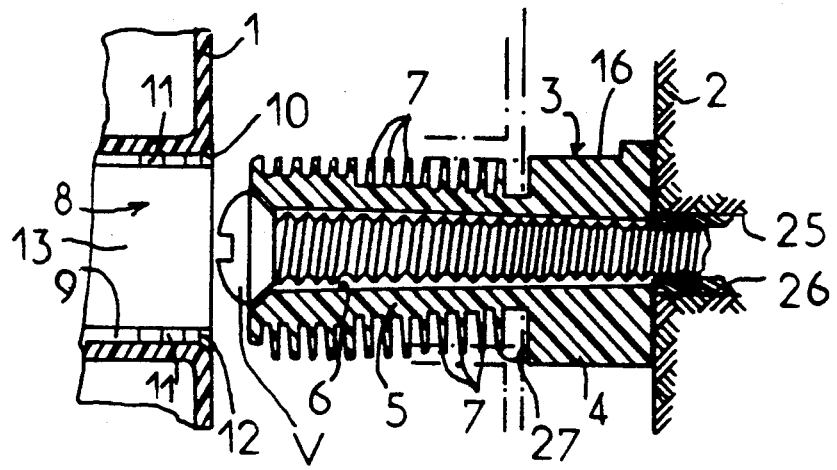
FIG. 1 is a schematic view in horizontal cross section showing a securement device for two members according to the invention of which a first member represents a portion of an appliance housing and of which a second member represents a portion of a vertical wall.

The securement device shown in FIG. 1 is adapted to retain in a predetermined position a first member 1 such as an appliance housing on a second member 2, for example a vertical wall. As is better shown in FIG. 4, the securement device comprises respectively a securement member 3 of plastic material and having a relatively rigid foot 4 adapted to be secured on the wall 2 and prolonged by a body 5 having the general shape of a cylinder and provided on at least one region of its side surface with protruding elastic hooking means. The body 5 and the foot 4 are traversed by an axial hole 6 adapted to receive a screw V for securement on the wall 2.

In the embodiment shown in FIGS. 1, 4, 5 and 6, the hooking means comprises two longitudinal rows of diametrically opposed ribs 7, said ribs 7 extending each beyond the body 5 about a sector transverse to the axis of the cylinder and each having a certain elasticity in the axial direction.

The securement device comprises on the first member 1 a seat 8 whose internal side wall 9 has a shape of revolution such as for example a truncated cone whose small base 10 forming the opening is turned toward the first member 2 and which is adapted to receive with friction the body 5 and the hooking means formed by the two rows of ribs 7. To promote friction, the seat has, particularly at the level of the mouth 10, a smaller diameter than the axial extent of body 5 prolonged by the ribs 7. Moreover, the internal side wall 9 has two striated regions 11 and 12 transverse to the axis of the truncated cone and disposed facing each other.

Figure 2:
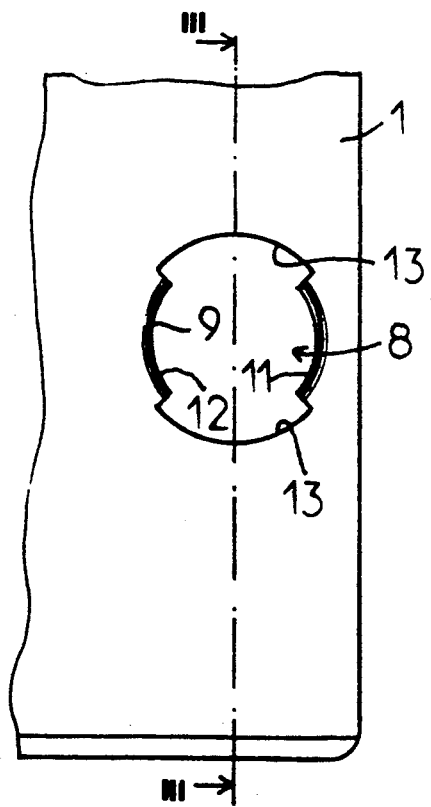
FIG. 2 is a fragmentary profile and elevational view of the portion of the first member showing the shape of a seat of the securement device.
Figure 3:
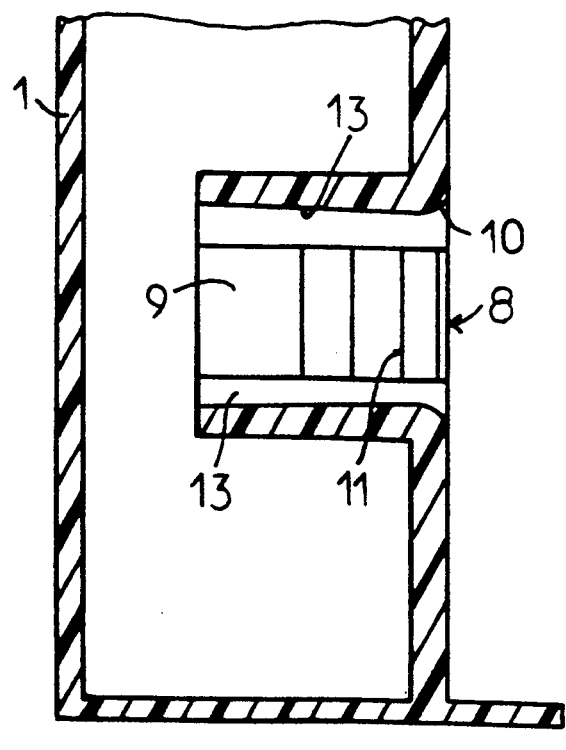
FIG. 3 is a view on line III—III of FIG. 2.

According to the invention, the securement member 3 and the seat 8 comprise a mutual unlocking means permitting, by movement of rotation about the axis of the body 5 between the securement member 3 and the seat 8, obtaining the release of the hooking means 7 from the internal side wall 9 of the seat 8. To obtain this release, the seat 8 comprises in its lateral wall 9 at least one recess 13, and preferably as is seen in FIG. 2 two recesses each having a contour of a shape complementary to the contour of the ribs 7. So as to facilitate rotation of the securement member 3, the foot 8 comprises at least one gripping surface 14 formed by a flat, and preferably as shown in FIG. 6 four flats 14, 15 and 16, 17.

According to another embodiment shown in FIGS. 7 and 8 of the securement member 18 having a body 19 having the general shape of a cylindrical barrel, the hooking means is comprised by a plurality of small annular collars 20 each having the general shape of a truncated cone whose summits 21 are turned toward the free end of the body, the mutual unlocking means comprising on the one hand, on each small collar 20 a flat 22 provided on its peripheral edge, and on the other hand in the seat 23 a longitudinal flat 24 provided in its internal side wall 24'. The flats 22 of the small collars 20 are disposed in the same longitudinal plane.

The securement member 18 comprises in its middle region a foot 25 which has on the opposite side of body 19 another body 26 provided with means for anchoring in a hole in a wall. This anchoring means comprises a plurality of small collars 27 of truncated conical shape and whose summits are also turned toward the free end of body 26.

Referring to FIG. 1, there will be explained hereafter the mounting of a housing 1, such as for example that of a hair dryer, on a wall 2. Let it be supposed that the housing 1 has two spaced seats 8 and the wall two corresponding holes 25 adapted each to receive a socket 26.

For each securement device, the securement member 3 is applied with its foot 4 against the wall 2 facing the hole 25 then is secured by means of the screw V while being careful to position the ribs 7 in a predetermined position relative to the seat 8.

Then the housing 1 is forcefully pressed toward the wall so as to cause the ribs 7 to bend in the direction of the axis of body 5, until housing 1 arrives in contact with the abutment 27 of the foot 5 and occupies the position shown in broken lines. The ribs 7 thus exert strong friction against the wall 9 preventing any removal and hence any demounting of the appliance by someone other than the installer.

To permit removal, it suffices to slide a tool of the pliers type between the housing 1 and the wall 2, to grasp the foot 4 by two flats, for example 14 and 15, and to impose then a movement of rotation of a quarter of a turn on the securement member 3 so as to bring the two rows of ribs into registry with the recesses 13. In this position, the ribs 7 move outwardly and escape into the recesses 13 thereby avoiding any friction against the internal wall 9 and thus permit the unlocking of said securement device and accordingly removal of the housing 1.

In the case of FIGS. 7 and 8, the unlocking operation is similar because it suffices to grasp two flats 28 of the foot 25 and to rotate the row of flats 22 into facing relation with the flat 24 of seat 23.

What is claimed is:

1. In a securement device adapted to retain in a predetermined position a first member (1) on a second member (2), and comprising respectively a securement member (3-18) having a relatively rigid foot (4-25) adapted to be secured to a first member and prolonged by a body (5-19) having on at least one region of its lateral surface a protruding elastic hooking means (7-20), and a seat (8-23) provided in the second member of which the internal side wall (9-24') has a shape of revolution, and adapted to receive with friction the body (5-19) and the hooking means (7-20); the improvement wherein the securement member (3-18) and the seat (8-23) comprise mutual unlocking means (13-22-24) permitting, by a movement of rotation between the securement member (3-18) and the seat (8-23), the escape of the hooking means (7-20) from the side wall (9-24') of the seat (8-23), the body (19) of the securement member (18) having the general shape of a cylindrical barrel, the hooking means being formed by a plurality of small annular collars (20) each having the general shape of a truncated cone whose summits (21) are turned toward the free end of the body, the mutual unlocking means comprising on each small collar (20) a flat (22) provided on its peripheral edge and in the seat (23) a longitudinal flat (24) provided in its internal side wall (24').

2. Securement device according to claim 1, wherein the body of the securement member (3) has the general shape of a cylinder, the hooking means is comprised by at least one longitudinal row of ribs (7) each extending about a sector transversely of the axis of the cylinder and each having a certain elasticity in the axial direction, and, the seat (8) having a diameter smaller than the axial extent of the body (5) prolonged by the ribs (7), the mutual unlocking means comprises at least one recess (13) provided in the side wall (9) of the seat (8) and adapted to receive, after rotation, said ribs (7).

3. Securement device according to claim 2, wherein the hooking means comprises two rows of diametrically opposed ribs (7) and the seat (8) also comprises two recesses (13) each having a shape complementary to the shape of the ribs (7).

4. Securement device according to claim 1, wherein the foot (4) of the securement member (3) comprises at least one gripping surface (14, 15, 16, 17) so as to permit the rotation of said member.

5. Securement device according to claim 1, wherein the first member (1) is an appliance housing and the second member (2) is a vertical wall.

6. Securement device according to claim 1, wherein the foot (5-25) of the securement member (3-18) has on the opposite side of the body (5-19) provided with the hooking means, another body (26) provided with anchoring means (27).

* * * * *